Patented Nov. 20, 1928.

1,692,692

UNITED STATES PATENT OFFICE.

LOUIS GABRIEL PATROUILLEAU, OF PARIS, FRANCE, ASSIGNOR TO SOCIÉTÉ ALUMINE ET DÉRIVÉS, OF PARIS, FRANCE, A JOINT-STOCK COMPANY.

PROCESS FOR THE MANUFACTURE OF SULPHATE OF ALUMINUM.

No Drawing. Application filed September 23, 1925, Serial No 58,100, and in France September 29, 1924.

The present invention relates to a process for the manufacture of alumina and of sulphate of aluminum and it also relates to the products obtained by means of the said process.

The process according to the invention consists in starting with a solution of multiple sulphates resulting from the action of sulphuric acid upon bauxite, in transforming the salts of iron contained in said solution into ferrous salts, in treating this reduced solution by oxide of iron freshly formed in the solution itself by adding iron and heating the solution, in diluting the solution treated in this manner so as to precipitate the basic sulphate of aluminum thus obtained, and in separating it from this liquid by filtration or centrifugation. The dilution of the solution is effected preferably by means of weak lyes of alkaline carbonates so as to avoid the well known phenomenon of hydrolysis which would take place if pure water were used and which might cause a reduction in efficiency.

The invention furthermore consists in shortening the thermic treatment by adding to the reduced solution, hydrate of alumina or basic sulphate of aluminum.

The invention furthermore consists in transforming the basic sulphate of aluminum thus obtained into normal sulphate by the addition of a supplementary quantity of acid, the normal sulphate being then crystallized.

Finally in order to obtain alumina, the invention consists in heating the basic sulphate of aluminum obtained by means of the process mentioned above, to a high temperature, said sulphate thus being dissociated to form anhydrous alumina and sulphuric acid which can be recuperated by condensation.

The invention also comprises the alumina and the sulphate of aluminum obtained by means of these processes.

The solution of multiple sulphates resulting from the action of sulphuric acid upon bauxite contains:

Sulphate of aluminum $Al_2(SO_4)_3$.
Ferric sulphate $Fe_2(SO_4)_3$ coming from the peroxide of iron contained in the bauxite.
Ferrous sulphate coming from the dissociation of the ilmenite contained in the bauxite $(Fe_2Ti_2)O_3 = 2FeO2TiO_2$.
Sulphate of titanium, $Ti(SO_4)_2$.
Traces of sulphuric acid.

These solutions can easily be reduced by any known means so as only to contain the salts of iron in the form of ferrous salts.

The laws of thermochemistry can be applied to a solution of this kind, namely those laws which apply to the maximum work. For example, if the tables of Berthelot (Thermochimie, vol. 2, page 781 of 1897) relative to the formation of heat for equivalent quantities of sulphate of aluminum and of ferrous sulphate are studied, it will be seen that for a given quantity of acid and with half a molecule gramme of $SO_4H2$ diluted in two to four litres of water we obtain:

in solution +12.5 calories;

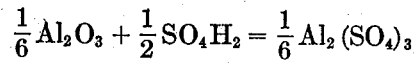

in solution +10.5 calories, representing a difference of +2 calories.

In consequence, the protoxide of iron, FeO, will release $Al_2O_3$ from its sulphate and will combine with the acid of this sulphate.

The present process is based upon this theory.

According to the invention, the reaction above referred to consists in heating for a considerable time a solution of sulphate of aluminum, the ferric salts of which have been transformed into ferrous salts, and containing iron in small particles. Upon heating, the iron oxidizes and becomes FeO and this latter, in view of the principle of maximum work, absorbs a portion of the acid of the sulphate of aluminum so as to assume the state of dissolved ferrous sulphate, at the same time releasing the corresponding fraction of the base $Al_2O_3$. The green coloration of the solution increases in accordance with the increase of the ferrous sulphate, while this solution slowly becomes cloudy when basic sulphate of aluminum is formed.

The solution, after the above treatment, is poured into a reservoir containing a suitable volume of water.

In view of this dilution, the basic sulphate of aluminum is precipitated and can be recovered by filtration or centrifugation. It is of an extremely white colour, very pure, and corresponds to the following formula: $Al_n(SO_4)_m$ in which $n$ is greater than 2 and $m$ is less than 3.

According to the invention, the thermal treatment could be shortened by adding to the solution, hydrate of alumina, $(Al_2O_3, 3H_2O)$ or, more simply, by adding a portion of a basic sulphate of aluminum coming from a prior operation.

Under the influence of the thermal treatment, this hydrate of alumina or this basic sulphate of aluminum dissolves rapidly and combines with the normal sulphate of aluminum contained in the solution, which fact expedites the operation.

By means of these additions the general operation can be reduced to a few hours and the basic sulphate of aluminum can be obtained very cheaply.

After drying at 100° C., the basic sulphate of aluminum separated out can be transformed into normal sulphate by the addition of a supplementary quantity of acid and can be crystallized for sale purposes.

If it is desired to obtain alumina, the basic sulphate of aluminum is introduced into a furnace and heated to a high temperature. It splits up into anhydrous $Al_2O_3$ which remains in the furnace and which can be collected, and also into distilled sulphuric acid which is then recovered by condensation.

I claim:

1. The process for the manufacture of aluminum sulphate which comprises reacting upon bauxite with sulphuric acid, reducing the iron content of the resulting solution into the ferrous state by the addition of an excess of metallic iron thereto and heating, diluting and precipitating the aluminum content of said solution, and recovering the aluminum compounds so precipitated.

2. The process for the manufacture of aluminum compounds which comprises reacting bauxite with sulphuric acid, adding metallic iron to the resulting solution and heating the same thereby reducing the iron content thereof to the ferrous condition, adding aluminum hydroxide to the reduced solution, and precipitating said solution, to recover from such solution a basic aluminum compound.

3. The process for obtaining aluminum sulphate which comprises reacting upon bauxite with sulphuric acid, reducing the iron content thereof to the ferrous condition, adding metallic iron to the reduced solution and converting the same into ferrous sulphate in the presence of the reduced solution by interaction with the acid content thereof, and separating and recovering by precipitation from said solution a basic aluminum compound.

4. The herein-described process for obtaining an insoluble sulphate of aluminum from bauxite, consisting in subjecting the bauxite to the action of sulphuric acid to reduce the bauxite to a solution of multiple sulphates, transforming the salts of iron contained therein to soluble ferrous salts through the addition of iron and the action of heat, diluting the resultant so as to precipitate the basic sulphate of aluminum, and recovering the insoluble sulphate of aluminum.

LOUIS GABRIEL PATROUILLEAU.